United States Patent
Arya et al.

(10) Patent No.: US 10,521,772 B2
(45) Date of Patent: Dec. 31, 2019

(54) PERSONALIZED JOB SEARCH AND RECOMMENDATIONS USING JOB SEEKER BEHAVIORAL FEATURES

(71) Applicant: Microsoft Technology Licensing, LLC, Redmond, WA (US)

(72) Inventors: Dhruv Arya, Sunnyvale, CA (US); Benjamin Hoan Le, San Jose, CA (US); Ganesh Venkataraman, San Jose, CA (US); Shakti Dhirendraji Sinha, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 15/295,505

(22) Filed: Oct. 17, 2016

(65) Prior Publication Data
US 2018/0107982 A1    Apr. 19, 2018

(51) Int. Cl.
| | |
|---|---|
| *G06Q 10/10* | (2012.01) |
| *G06Q 10/06* | (2012.01) |
| *G06Q 30/08* | (2012.01) |
| *G06Q 30/02* | (2012.01) |
| *G06Q 10/00* | (2012.01) |
| *G06Q 50/00* | (2012.01) |
| *G06F 16/951* | (2019.01) |

(52) U.S. Cl.
CPC ........ *G06Q 10/1053* (2013.01); *G06Q 50/01* (2013.01); *G06F 16/951* (2019.01); *G06Q 10/105* (2013.01)

(58) Field of Classification Search
CPC ... G06Q 10/105; G06Q 10/1053; G06Q 50/01
USPC .......................... 705/1.1–912, 319, 320, 321
See application file for complete search history.

(56) References Cited

U.S. PATENT DOCUMENTS

| | | |
|---|---|---|
| 2012/0215795 A1 | 8/2012 | Phelon et al. |
| 2014/0122355 A1 | 5/2014 | Hardtke et al. |
| 2016/0132602 A1 | 5/2016 | Pattabiraman et al. |

FOREIGN PATENT DOCUMENTS

WO    2018075220    4/2018

OTHER PUBLICATIONS

"International Application Serial No. PCT/US2017/054263, International Search Report dated Dec. 14, 2017", 2 pgs.
"International Application Serial No. PCT/US2017/054263, Written Opinion dated Dec. 14, 2017", 6 pgs.

*Primary Examiner* — Jonathan P Ouellette
(74) *Attorney, Agent, or Firm* — Schwegman Lundberg & Woessner, P.A.

(57) ABSTRACT

A user submits a job search query in an online social networking system. The online social networking system calculates a score based on the similarity between the job search query and the profile of the user. When the score transgresses a threshold, the job search query is enhanced by adding data from the profile of the user to the job search query. The job search query is then used to search for, identify, and display jobs in the online social networking system.

20 Claims, 4 Drawing Sheets

PERSONALIZED JOB SEARCH AND RECOMMENDATIONS USING JOB SEEKER BEHAVIORAL FEATURES

TECHNICAL FIELD

The present disclosure generally relates to the technical field of online social networking services, and in an embodiment, but not by way of limitation, to a personalized job search and personalized job recommendations using job seeker behavioral features.

BACKGROUND

Online social networks provide its members the ability to connect and communicate with other members. Online social networks include a personal profile for each member, which includes the educational history, work history, and personal interests of the member. Many online social networks also include a job posting functionality, wherein employers can post available jobs and potential employees can search through the posted job openings. As with job advertisements prior to the creation of online social networks, such posted available jobs include information such as the employer name, job title, required work experience, required educational level, and starting salary.

DESCRIPTION OF THE DRAWINGS

Some embodiments are illustrated by way of example and not limitation in the accompanying drawings, in which.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

A goal of an embodiment of the present disclosure is to build company-based and job title-based feature sets based on site wide activity of users in an online social networking system. High level items in this embodiment include past searches by the user, past job applications of the user, and inference features from the user's network and site wide activities.

To find a job that best suits their abilities and meets their career aspirations, active job seekers have a set of skills, titles, and a limited set of companies in mind where they would like to apply and get a job. Each job seeking session is different and leads to two possible outcomes—a contact from a recruiter or a rejection. An embodiment of this disclosure narrows down the entities in which a job seeker will be interested. An online social networking system, through the activities of users on the system, determines the job titles that are of interest to the users, the skills that the users want their jobs to require, and for which companies do the users want to work. One or more embodiments implement methodologies to collect data and to analyze that collected data in this effort.

These activities on the system can be grouped into company-based features or job title-based features. Company-based feature sets are determined based on a user's non-company queries, and job title-based feature sets are determined based on a user's company queries. Company queries are queries that indicate a particular company, such as by selecting a company facet in constructing a search query. Non-company queries are queries that do not indicate a particular company. In general, when a job seeker invokes a particular company in the job search query, that job seeker is showing an interest in that company. Additionally, job seekers show their interest in the type of work they want to do when they search for a particular company. Consequently, based on the companies that are used in the search query by the user, the online social networking system can infer the following. The online social networking system can infer the type of company for which the job seeker would like to work. For example, is the job seeker interested in volunteering, working for a non-profit company, working for a privately held company, or working for a publically traded company. This information assists the online social networking system in determining which institutions a user is likely to apply and find themselves working. The online social networking system can also infer the size of the company at which a job seeker would like to work. The online social networking system can also determine in which industries or lines of business that a job seeker would like to work. It is noted that certain companies may have subsidiaries that span multiple industries and/or be involved in projects across multiple domains. The analysis of these companies can assist the online social networking system in understanding the job seeker's area of focus. Additionally, the online social networking system can determine the geographic locations in which a job seeker is interested.

Based on the foregoing, the online social networking system can determine the following sets of features. The system can determine the companies that a job seeker has searched for in a particular recent period, such as the last thirty days. As noted, this could include explicitly listing the company in the search query, noting the company via a facet, and/or noting the company via some type of advanced field or search mechanism. The system can also determine the companies to which a job seeker has applied in a particular recent time period. The online social networking system can also infer from the job seeker's activities the companies in which the job seeker is interested. This can be accomplished for example by examining the job seeker's viewings of a company's website, the job seeker's interactions with updates of the company, etc. The online social networking system can also determine network transition companies, which are companies to which connections of the job seeker are transitioning. The online social networking system can also determine the companies with which the job seeker has first degree connections with either an employee of that company (with a same title or role, or in the same industry) or a recruiter for that company.

In addition to the job seeker being interested in particular companies and the information that can be inferred from such interest by the online social networking system, job titles form an important component of a search by a job seeker. Job seekers need to be aware of the job titles that a company has, how such job titles fit in with the job seeker's current title, and whether the job seeker will be able to get a compensation package that is similar to or greater than the compensation package that the job seeker currently has. When job seekers use job titles in their job search queries, the online social networking system can glean from such queries the job titles themselves, job super titles, job functions, and job seniorities. Similar to the case wherein a job seeker searches for a particular company, the searching for a particular job title can appear directly in the job search query, in a facet, and/or in an advanced search field. The online social networking system can also infer job titles by examining profiles that are viewed by the job seekers, job views by the job seeker, and network connections of the job seeker. In an embodiment, the online social networking system maps job titles to standardized ids, and then groups these job title ids into super titles. For example, the job titles of software engineer, software developer, and software programmer can all be grouped under the super title software developer.

Additionally, job seekers look for jobs that have an overlap with their current set of skills. Job seekers also at times explicitly search for skills in order to view jobs that require such skills. The skills can range from being very generic such as software engineering or product management to machine learning or under water drilling. The online social networking system can understand and interpret the skill interests a member has. And like with companies and job titles, a job searcher can include particular skills in the search query and/or these skills can be inferred from activities of the job seeker on the online social networking system.

In view of the foregoing, the present disclosure describes methods, systems, and computer program products for a personalized job search and a personalized job recommendation using behavioral features of the person who is seeking jobs in an online social networking system. More specifically, the online social networking system receives a job search query from a user. The online social networking system calculates a score based on the similarity between the job search query and the profile of the user. The profile of the user can be based on the user's activity on the online social networking system or data directly entered into the user's profile by the user. When the score transgresses a threshold, the online social networking system enhances the job search query by adding data from the profile of the user to the job search query. The online social networking system then uses the job search query to search for jobs on the online social networking system, identify jobs in the online social networking system based on the job search query, and display on a computer display device one or more jobs identified using the job search query.

The above-noted similarity between a job search query and the user profile prevents homophily features that result in over personalization of the search results. The online social networking system computes homophily interaction features and discounts the homophily score by this amount to prevent over personalization. In short, over personalization relates to the online social networking system inferring too much about a job seeker and the job seeker's query, such as when a person with many years of java experience is currently searching for an employment position that does not involve java. As noted, in order to understand this similarity the online social networking system examines core entities—namely, titles and skills. These entities form the core of job search behavior on an online social networking system and also represent essential information from the job seeker's profile. As discussed in more detail herein, the online social networking system makes use of features and situations such as when the job title in the job search query overlaps with the job seeker's current job title, the job title in the job search query overlaps with the job searcher's past job title, the super job title in the job search query overlaps with the super job title of the job searcher, and the job skill in the job search query overlaps with the explicit skills of the job searcher.

Figure 1:
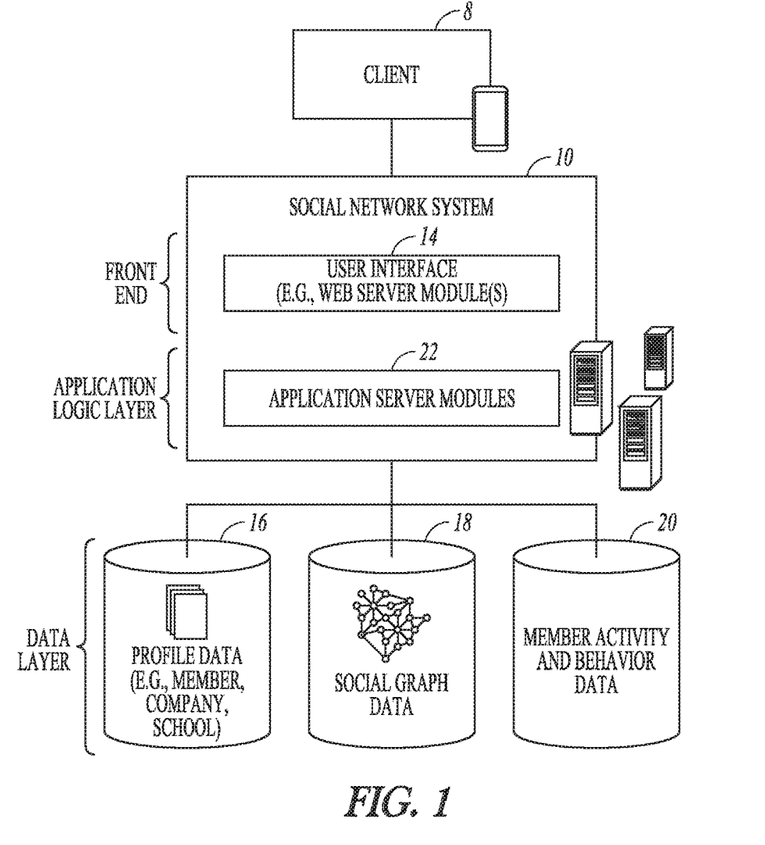
FIG. 1 is a block diagram of the functional modules or components that comprise a computer network-based online social networking system, including application server modules consistent with some embodiments of the invention.

Referring now to the drawings, FIG. 1 is a block diagram of the functional modules or components that comprise a computer-based or network-based online social networking service 10 consistent with some embodiments of the invention. As shown in FIG. 1, the online social networking service 10 is generally based on a three-tiered architecture, comprising a front-end layer, application logic layer, and data layer, and can communicate with a client device 8. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the present subject matter with unnecessary details, various functional modules and engines that are not germane to conveying an understanding of the present subject matter have been omitted from FIG. 1. However, a skilled artisan will readily recognize that various additional functional modules and engines may be used with an online social networking service, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the present subject matter is by no means limited to such architecture.

As shown in FIG. 1, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the online social networking service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the online social networking service. A "connection" may require a bi-lateral agreement by the members, such that both members acknowledge the establishment of the connection. The degree of connectivity refers to the amount or number of connections that exist for a particular person and/or the amount or number of connections among a group of persons. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the online social networking service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generate various user interfaces (e.g., web pages) with data retrieved from various data sources in the data layer. With some embodiments, individual application server modules 22 are used to implement the functionality associated with various applications, services and features of the online social networking service. For instance, a messaging application, such as an email application, an instant messaging application, or some hybrid or variation of the two, may be implemented with one or more application server modules 22. Of course, other applications or services may be separately embodied in their own application server modules 22.

The online social networking service may provide a broad range of applications and services that allow members the opportunity to share and receive information, often customized to the interests of the member. For example, with some embodiments, the online social networking service may include a photo sharing application that allows members to upload and share photos with other members. As such, at least with some embodiments, a photograph may be a property or entity included within a social graph. With some embodiments, members of an online social networking service may be able to self-organize into groups, or interest groups, organized around a subject matter or topic of interest. Accordingly, the data for a group may be stored in a database. When a member joins a group, his or her membership in the group will be reflected in the social graph data stored in the database with reference number 18. With some embodiments, members may subscribe to or join groups affiliated with one or more companies. For instance, with some embodiments, members of the online social networking service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 18.

Figure 2:
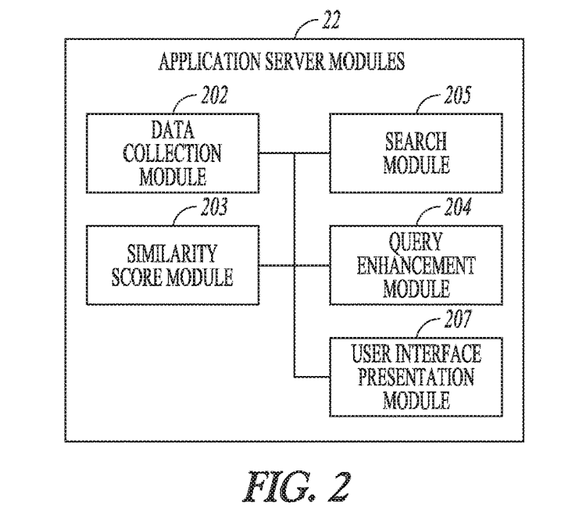
FIG. 2 is a block diagram depicting some example application server modules of FIG. 1.

FIG. 2 is a block diagram depicting some example application server modules 22 of FIG. 1. A data collection module 202 may be configured to collect and/or receive, for example, a job search query from a user. Other data that can be collected by the data collection module 202 include other profile data, behavior data, endorsement data, online social networking service data, occupation data, and connectivity data. A similarity score module 203 determines the similarity between the user's job search query and the user's profile and/or the user's activity on the online social networking system. A query enhancement module 204 enhances the search query of the user when the search query of the user and the user's profile and/or activity on the system are similar. A search module 205 uses the user's job search query to search for and identify jobs on the online social networking system. A user interface presentation module 207 generates a user interface for presentation to the user. The user interface may include information pertaining to the results of the job search using the user's job search query.

Figure 3A:
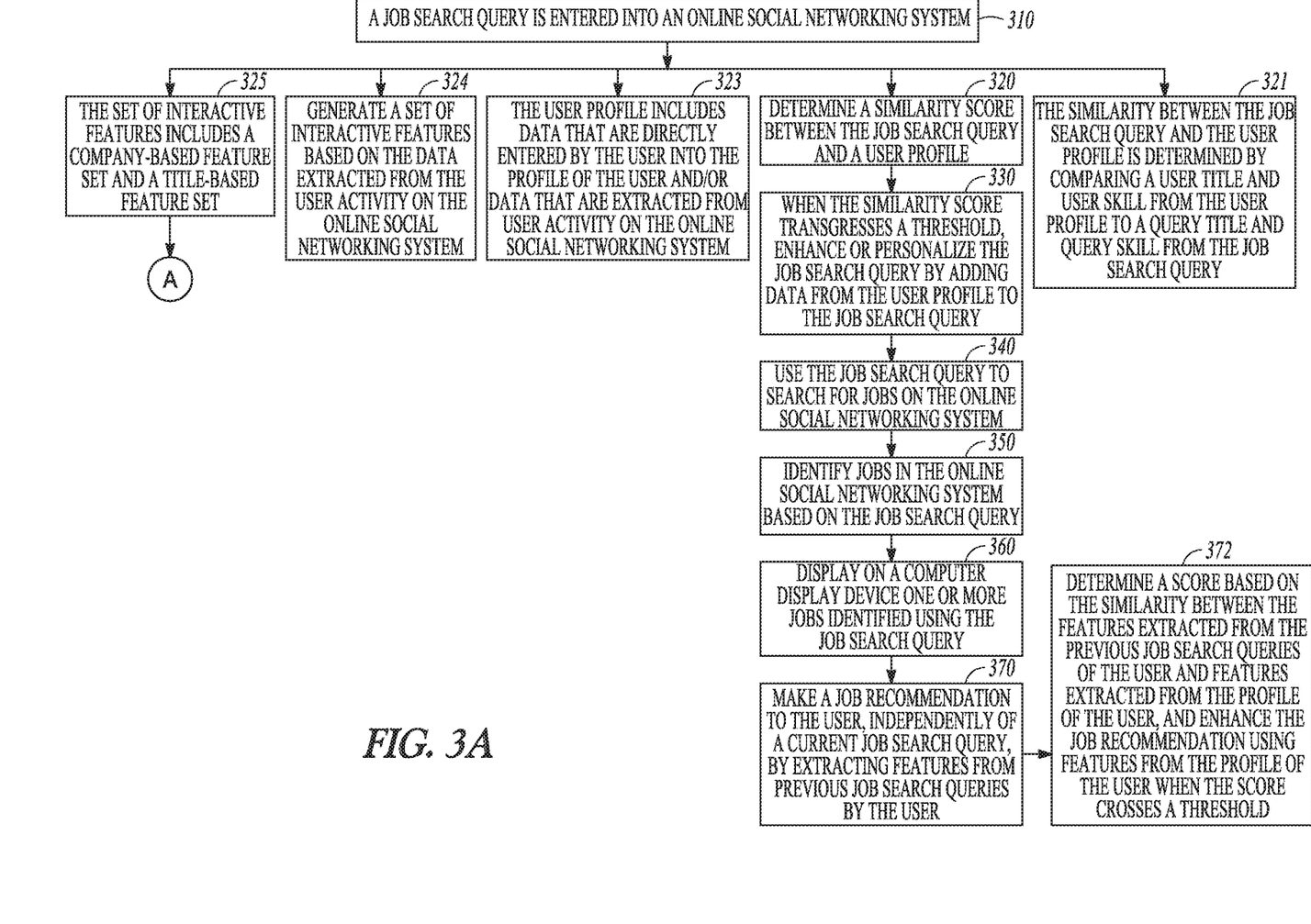
FIGS. 3A and 3B are a flow diagram of an example embodiment of a process to personalize job search and job recommendations using job seeker behavioral features.
Figure 3B:
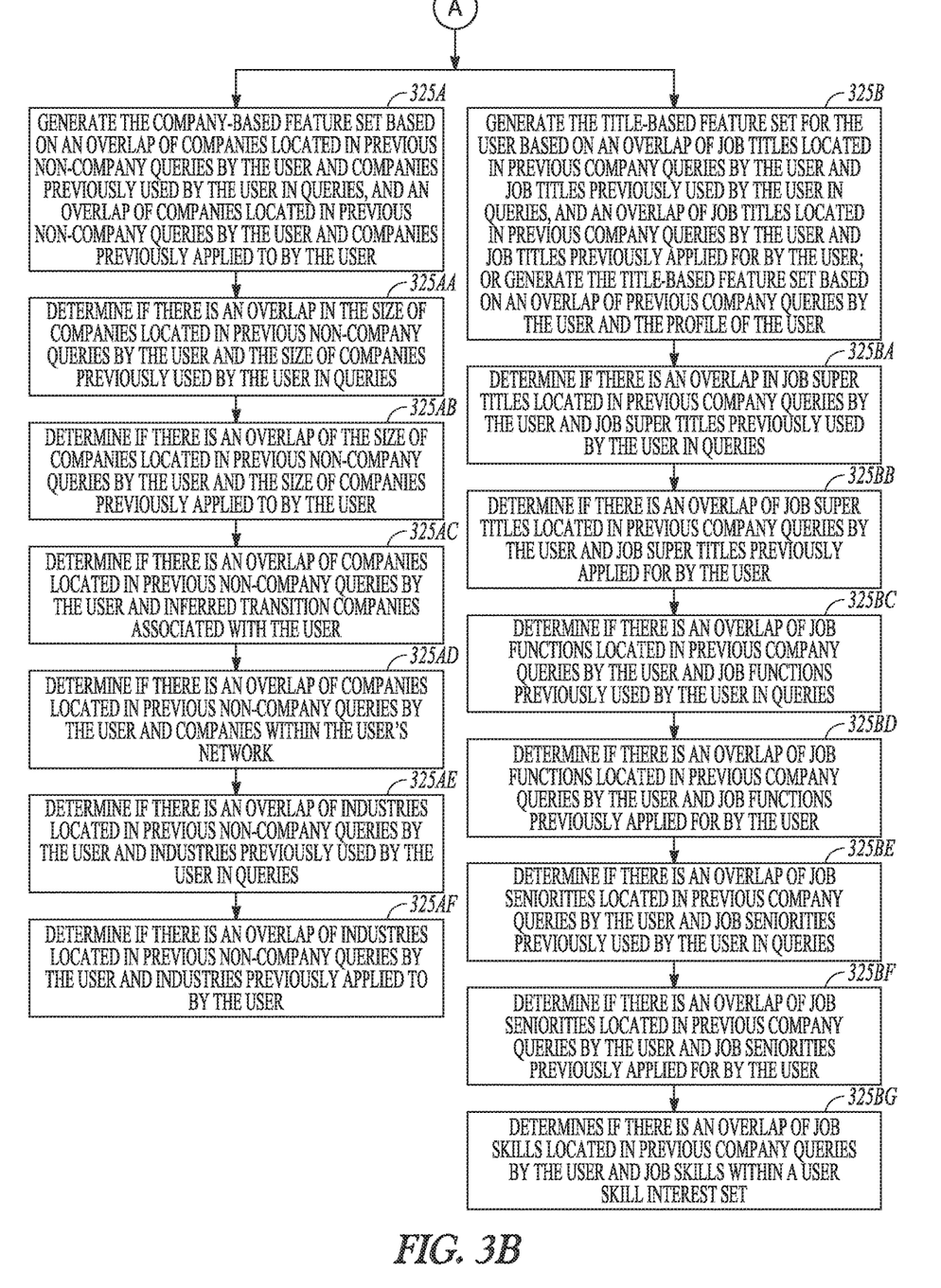

FIGS. 3A-3B are a flow diagram illustrating an example method of personalizing job searches and job recommendations to users of an online social networking system using behavioral features of the users. In various embodiments, the method may be implemented by one or more of the modules or processors of FIG. 2. FIGS. 3A-3B include a number of process blocks 310-372. Though arranged somewhat serially in the example of FIGS. 3A-3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 3A and 3B, at 310, a user enters a job search query into the online social networking system. At 320, the online social networking system determines a similarity between the job search query and the profile of the user on the online social networking system. The online social networking system calculates a score based on this similarity. In an embodiment, as indicated at 321, the similarity between the job search query and the profile of the user is determined by comparing a user title and user skill from the profile of the user to a query title and query skill from the job search query. For example, a user who is searching for a java software engineer position and who has in his or her profile a title of software engineer and java listed as a skill will receive a score that indicates a similarity between the job search query and the profile of the user (for example, a score of 100). In contrast, a person who is searching for a java software engineer position, and who has in his or her profile a title of software engineer, but who does not have java listed as a skill, will not receive as high a score (for example, a score of 50), indicating less similarity between the job search query and the profile of the user.

At 330, when the score based on the similarity of the job search query and the profile of the user exceeds or transgresses a threshold, that is, when there is enough similarity between the job search query and the profile of the user, the online social networking system enhances the job search query by adding data from the profile of the user to the job search query. The rationale behind this execution is that if there is a high degree of similarity between the job search query and the profile of the user, then the user is apparently searching for a job in his or her present occupation and/or area of expertise, and using data from the user's profile will more likely than not assist in retrieving relevant job postings that will be of interest to the user. If there is a low degree of similarity between the job search query and the profile of the user, then the user may be looking for a job that is at least slightly different than his or her present occupation and/or area of expertise, and using data from the user's profile will not likely increase the chances of finding job postings of interest to the user, and may in fact return job postings for which the user has no current interest.

At 340, the online social networking system uses the job search query to search for jobs on the online social networking system. Based on the results of operation 330, this job search query could be either an enhanced or non-enhanced job search query. At 350, the online social networking system identifies jobs in the online social networking system based on the job search query, and at 360, the online social networking system displays on a computer display device one or more jobs identified using the job search query.

As indicated at 323, the profile of the user can include data that are directly entered by the user into the profile of the user, and/or data that are extracted from user activity on the online social networking system. At 324, the online social networking system includes the functionality of generating a set of interactive features based on the data extracted from the user activity on the online social networking system.

As indicated at 325, the set of interactive features includes a company-based feature set and a title-based feature set. At operation 325A, the online social networking system generates the company-based feature set based on an overlap of companies located in previous non-company queries by the user and companies previously used by the user in queries, and an overlap of companies located in previous non-company queries by the user and companies previously applied to by the user. For example, if a user has previously searched for a job as a java developer, without specifying any companies in the job search query (i.e., a non-company query), and such a previous search returned jobs from companies A, B, and C, and the user has previously used company C in a general query, then company C is added to the company-based feature set. Similarly, if a user has previously searched for a job as a java developer, without specifying any companies in the job search query, and such a previous search returned jobs from companies A, B, and C, and the user has previously applied for a job at company B, then company B is added to the company-based feature set. The company-based feature set can be considered as part of the user profile that is generated from user activity on the online social networking system, and can be used in the calculation of the score to determine whether a user's job search query is enhanced (or personalized).

At operation 325B, the online social networking system generates the title-based feature set for the user based on an overlap of job titles located in previous company queries by the user and job titles previously used by the user in queries, and an overlap of job titles located in previous company queries by the user and job titles previously applied for by the user. For example, if the user has previously searched for jobs in company A (i.e., a previous company query), and found job titles A, B, and C, and the user has previously searched for jobs with job title A, then job title A is added to the user's title-based feature set. Similarly, if the user has previously searched for jobs in company A, and found job titles A, B, and C, and the user has previously applied for a job that has job title B, then job title B is added to the user's title-based feature set. In an alternative embodiment of operation 325B, the online social networking system generates the title-based feature set based on an overlap of previous company queries by the user and the profile of the user. So, for example, if a user has used company A in a previous query by the user and located job titles A and B in those previous searches of company A, and job title B appears in the user's profile on the online social networking system, then job title B is added to the title-based feature set for this user.

Operations 325AA-325AF illustrate several manners in which the online social networking system generates the company-based feature set. At 325AA, the online social networking system determines if there is an overlap in the size of companies located in previous non-company queries by the user and the size of companies previously used by the user in queries. If there is, then the companies in the overlap are added to the company-based feature set. At 325AB, the online social networking system determines if there is an overlap of the size of companies located in previous non-company queries by the user and the size of companies previously applied to by the user. If there is, then the companies in the overlap are added to the company-based feature set. At 325AC, the online social networking system determines if there is an overlap of companies located in previous non-company queries by the user and inferred transition companies associated with the user. An inferred transition company is a company to which employees from another company tend to transfer. An inferred transition company can be determined concretely by examining the job histories of a plurality of users, or more inferentially by examining a user's company page views, interactions with company updates, and other online interactions with the company. If there is an overlap of companies located in previous non-company queries by the user and inferred transition companies associated with the user, then those companies are added to the company-based feature set. At 325AD, the online social networking system determines if there is an overlap of companies located in previous non-company queries by the user and companies within the user's network (that is, for example, connections of the user are employed by these companies). If there is, then the companies in the overlap are added to the company-based feature set. At 325AE, the online social networking system determines if there is an overlap of industries located in previous non-company queries by the user and industries previously used by the user in queries. If there is, then the companies in those industries that overlap are added to the company-based feature set. At 325AF, the on line social networking system determines if there is an overlap of industries located in previous non-company queries by the user and industries previously applied to by the user. If there is, then companies in those industries are added to the company-based feature set.

In order to prevent over-personalization for company queries, the online social networking system computes the company-based feature set only for non-company queries by the job searcher. This allows the system to personalize the results of users for primarily other dominant query types that the system sees in other job search queries, namely, titles, skills and geographical locations.

Operations 325BA-325BG illustrate several manners in which the online social networking system generates the title-based feature set. At 325BA, the online social networking system determines if there is an overlap in job super titles located in previous company queries by the user and job super titles previously used by the user in queries. If there is an overlap, the overlapping job titles are added to the title-based feature set. At 325BB, the online social networking system determines if there is an overlap of job super titles located in previous company queries by the user and job super titles previously applied for by the user. If there is an overlap, the overlapping job titles are added to the title-based feature set. At 325BC, the online social networking system determines if there is an overlap of job functions located in previous company queries by the user and job functions previously used by the user in queries. If there is an overlap, the overlapping job functions are added to the title-based feature set. At 325BD, the online social networking system determines if there is an overlap of job functions located in previous company queries by the user and job functions previously applied for by the user. If there is an overlap, the overlapping job functions are added to the title-based feature set. At 325BE, the online social networking system determines if there is an overlap of job seniorities located in previous company queries by the user and job seniorities previously used by the user in queries. For example, in a job title of senior data analyst, the job seniority is "senior." If there is an overlap, the overlapping job seniorities are added to the title-based feature set. At 325BF, the online social networking system determines if there is an overlap of job seniorities located in previous company queries by the user and job seniorities previously applied for by the user. If there is an overlap, the overlapping job seniorities are added to the title-based feature set. At 325BG, the online social networking system determines if there is an overlap of job skills located in previous company queries by the user and job skills within a user skill interest set. If there is an overlap, the overlapping job skills are added to the title-based feature set.

To prevent over-personalization for title and skill based queries, the online social networking system computes the above title-based feature set for company-only queries or for queries which the company have some overlap with the searcher profile. These conditions allow the job searchers to search outside their domain and see non-personalized results if the query is tangential to their profile. At the same time, the online social networking system keeps a degree of personalization if there is a degree of overlap between the job searcher's profile and the job search query. However, as the job search query becomes more targeted, with more overlaps with the query and with the searcher's profile, the online social networking system discounts the personalization features to allow surfacing of results that meet this targeted search criteria.

As indicated at operation 370, the online social networking system makes a job recommendation to the user. This recommendation is made independently of a current job search query by extracting features from previous job search queries by the user. The online social networking system then uses the extracted features from the previous job search queries to identify one or more jobs in the online social networking system, and provides these identified job titles to the user. In this configuration, the online social networking system is using the past behavior of the user on the online social networking system, as captured by previous job search queries by the user, to recommend jobs that may be suitable and of interest to a user. This configuration is in contrast to an online social networking system that uses the profile of a user to recommend jobs to the user. At 372, the online social networking system determines a score based on the similarity between the features extracted from the previous job search queries of the user and features extracted from the profile of the user, and then enhances or personalizes the job recommendation using features from the profile of the user when the score crosses a threshold.

Figure 4:
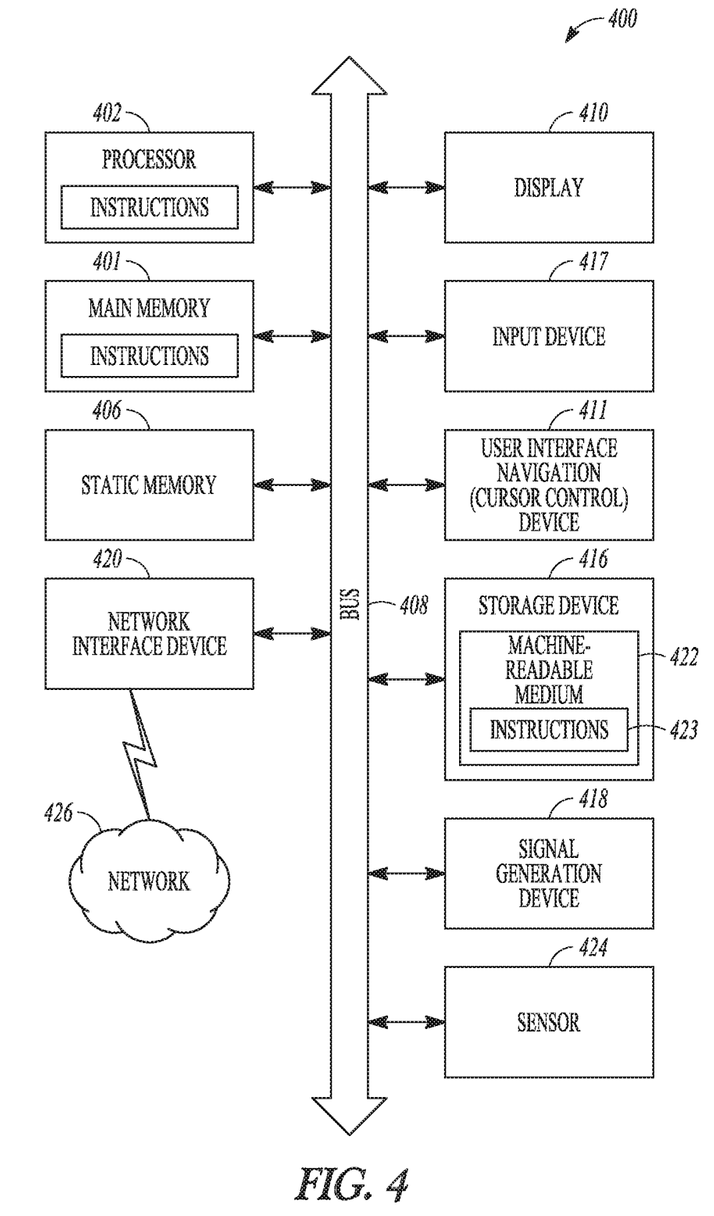
FIG. 4 is a block diagram of a machine in the form of a computing device within which a set of instructions, for causing the machine to perform any one or more of the methodologies discussed herein, may be executed.

FIG. 4 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 402 (e.g., a central processing unit (CPU), a graphics processing unit (GPU) or both), a main memory 401 and a static memory 406, which communicate with each other via a bus 408. The computer system 400 may further include a display unit 410, an alphanumeric input device 417 (e.g., a keyboard), and a user interface (UI) navigation device 411 (e.g., a mouse). In one embodiment, the display, input device and cursor control device are a touch screen display. The computer system 400 may additionally include a storage device 416 (e.g., drive unit), a signal generation device 418 (e.g., a speaker), a network interface device 420, and one or more sensors 421, such as a global positioning system sensor, compass, accelerometer, or other sensor.

The drive unit 416 includes a machine-readable medium 422 on which is stored one or more sets of instructions and data structures (e.g., software 423) embodying or utilized by any one or more of the methodologies or functions described herein. The software 423 may also reside, completely or at least partially, within the main memory 401 and/or within the processor 402 during execution thereof by the computer system 400, the main memory 401 and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 423 may further be transmitted or received over a communications network 426 using a transmission medium via the network interface device 420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A system comprising:
a computer readable medium having instructions stored thereon, which, when executed by a processor cause the system to:
receive a job search query from a user in an online social networking system;
calculate a score based on a similarity between the job search query and a profile of the user;
when the score transgresses a threshold, enhance the job search query by adding data from the profile of the user to the job search query;
use the enhanced job search query to search for jobs on the online social networking system;
identify jobs in the online social networking system based on the job search query; and
display on a computer display device one or more jobs identified using the job search query.

2. The system of claim 1, wherein the profile of the user comprises data directly entered by the user into the profile of the user and data extracted from user activity on the online social networking system.

3. The system of claim 2, comprising instructions for generating a set of interactive features based on the data extracted from the user activity on the online social networking system.

4. The system of claim 3, wherein the set of interactive features comprises a company-based feature set and a title-based feature set, and comprising instructions to:
generate the company-based feature set for the user based on an overlap of companies located in previous non-company queries by the user and companies previously used by the user in queries, and an overlap of companies located in previous non-company queries by the user and companies previously applied to by the user; and
generate the title-based feature set for the user based on an overlap of job titles located in previous company queries by the user and job titles previously used by the user in queries, and an overlap of job titles located in previous company queries by the user and job titles previously applied for by the user, or generate the title-based feature set based on an overlap of previous company queries by the user and the profile of the user.

5. The system of claim 4, comprising instructions to:
generate the company-based feature set for the user based on one or more of an overlap of size of companies located in previous non-company queries by the user and size of companies previously used by the user in queries, an overlap of size of companies located in previous non-company queries by the user and size of companies previously applied to by the user, an overlap of companies located in previous non-company queries by the user and inferred transition companies associated with the user, an overlap of companies located in previous non-company queries by the user and companies within the user's network, an overlap of industries located in previous non-company queries by the user and industries previously used by the user in queries; and an overlap of industries located in previous non-company queries by the user and industries previously applied to by the user; and generate the title-based feature set for the user based on one or more of an overlap of job super titles located in previous company queries by the user and job super titles previously used by the user in queries, an overlap of job super titles located in previous company queries by the user and job super titles previously applied for by the user, an overlap of job function located in previous company queries by the user and job function previously used by the user in queries, an overlap of job function located in previous company queries by the user and job function previously applied for by the user, an overlap of job seniority located in previous company queries by the user and job seniority previously used by the user in queries, an overlap of job seniority located in previous company queries by the user and job seniority previously applied for by the user, and an overlap of job skills located in previous company queries by the user and job skills within a user skill interest set.

6. The system of claim 1, comprising instructions that cause the system to make a job recommendation to the user, independently of the job search query, by extracting features from a previous job search query by the user, using the extracted features from the previous job search query to identify one or more jobs in the online social networking system, and providing the identified one or more jobs to the user.

7. The system of claim 6, comprising instructions for determining a score based on a similarity between the features extracted from the previous job search query of the user and features extracted from the profile of the user; and enhancing the job recommendation using features from the profile of the user when the score crosses a threshold.

8. The system of claim 1, wherein the score based on the similarity between the job search query and the profile of the user is determined by comparing a user title and user skill from the profile of the user to a query title and query skill from the job search query.

9. A method comprising:
receiving into a computer processor a job search query from a user in an online social networking system;
calculating a score based on a similarity between the job search query and a profile of the user;
when the score transgresses a threshold, enhancing the job search query by adding data from the profile of the user to the job search query;
using the enhanced job search query to search for jobs on the online social networking system;
identifying jobs in the online social networking system based on the job search query; and
displaying on a computer display device one or more jobs identified using the job search query.

10. The method of claim 9, wherein the profile of the user comprises data directly entered by the user into the profile of the user and data extracted from user activity on the online social networking system.

11. The method of claim 10, comprising generating a set of interactive features based on the data extracted from the user activity on the online social networking system.

12. The method of claim 11, wherein the set of interactive features comprises a company-based feature set and a title-based feature set; and
generating the company-based feature set for the user based on an overlap of companies located in previous non-company queries by the user and companies previously used by the user in queries, and an overlap of companies located in previous non-company queries by the user and companies previously applied to by the user; and
generate the title-based feature set for the user based on an overlap of job titles located in previous company queries by the user and job titles previously used by the user in queries, and an overlap of job titles located in previous company queries by the user and job titles previously applied for by the user, or generate the title-based feature set based on an overlap of previous company queries by the user and the profile of the user.

13. The method of claim 12, comprising:
generating the company-based feature set for the user based on one or more of an overlap of size of companies located in previous non-company queries by the user and size of companies previously used by the user in queries, an overlap of size of companies located in previous non-company queries by the user and size of companies previously applied to by the user, an overlap of companies located in previous non-company queries by the user and inferred transition companies associated with the user, an overlap of companies located in previous non-company queries by the user and companies within the user's network, an overlap of industries located in previous non-company queries by the user and industries previously used by the user in queries; and an overlap of industries located in previous non-company queries by the user and industries previously applied to by the user; and
generating the title-based feature set for the user based on one or more of an overlap of job super titles located in previous company queries by the user and job super titles previously used by the user in queries, an overlap of job super titles located in previous company queries by the user and job super titles previously applied for by the user, an overlap of job function located in previous company queries by the user and job function previously used by the user in queries, an overlap of job function located in previous company queries by the user and job function previously applied for by the user, an overlap of job seniority located in previous company queries by the user and job seniority previously used by the user in queries, an overlap of job seniority located in previous company queries by the user and job seniority previously applied for by the user, and an overlap of job skills located in previous company queries by the user and job skills within a user skill interest set.

14. The method of claim 9, comprising instructions making a job recommendation to the user, independently of the job search query, by extracting features from a previous job search query by the user, using the extracted features from the previous job search query to identify one or more jobs in the online social networking system, and providing the identified one or more jobs to the user.

15. The method of claim 14, comprising instructions for determining a score based on a similarity between the features extracted from the previous job search query of the user and features extracted from the profile of the user; and
enhancing the job recommendation using features from the profile of the user when the score crosses a threshold.

16. The method of claim 9, wherein the score based on the similarity between the job search query and the profile of the user is determined by comparing a user title and user skill from the profile of the user to a query title and query skill from the job search query.

17. A non-transitory computer readable medium having instructions stored thereon, which, when executed by a processor, execute a process comprising:
receiving a job search query from a user in an online social networking system;
calculating a score based on a similarity between the job search query and a profile of the user;
when the score transgresses a threshold, enhancing the job search query by adding data from the profile of the user to the job search query;
using the enhanced job search query to search for jobs on the online social networking system;
identifying jobs in the online social networking system based on the job search query; and
displaying on a computer display device one or more jobs identified using the job search query.

18. The non-transitory computer readable medium of claim 17, wherein the profile of the user comprises one or more of data directly entered by the user into the profile of the user and data extracted from user activity on the online social networking system; and
comprising instructions for generating a set of interactive features based on the data extracted from the user activity on the online social networking system;
wherein the set of interactive features comprises a company-based feature set and a title-based feature set, and comprising instructions to:
generate the company-based feature set for the user based on an overlap of companies located in previous non-company queries by the user and companies previously used by the user in queries, and an overlap of companies located in previous non-company queries by the user and companies previously applied to by the user; and
generate the title-based feature set for the user based on an overlap of job titles located in previous company queries by the user and job titles previously used by the user in queries, and an overlap of job titles located in previous company queries by the user and job titles previously applied for by the user, or generate the title-based feature set based on an overlap of previous company queries by the user and the profile of the user.

19. The non-transitory computer readable medium of claim 18, comprising instructions to:
generate the company-based feature set for the user based on one or more of an overlap of size of companies located in previous non-company queries by the user and size of companies previously used by the user in queries, an overlap of size of companies located in previous non-company queries by the user and size of companies previously applied to by the user, an overlap of companies located in previous non-company queries by the user and inferred transition companies associated with the user, an overlap of companies located in previous non-company queries by the user and companies within the user's network, an overlap of industries located in previous non-company queries by the user and industries previously used by the user in queries; and
an overlap of industries located in previous non-company queries by the user and industries previously applied to by the user; and
generate the title-based feature set for the user based on one or more of an overlap of job super titles located in previous company queries by the user and job super titles previously used by the user in queries, an overlap of job super titles located in previous company queries by the user and job super titles previously applied for by the user,
an overlap of job function located in previous company queries by the user and job function previously used by the user in queries, an overlap of job function located in previous company queries by the user and job function previously applied for by the user, an overlap of job seniority located in previous company queries by the user and job seniority previously used by the user in queries, an overlap of job seniority located in previous company queries by the user and job seniority previously applied for by the user, and an overlap of job skills located in previous company queries by the user and job skills within a user skill interest set.

20. The non-transitory computer readable medium of claim 17, comprising instructions that cause the system to make a job recommendation to the user, independently of the job search query, by extracting features from a previous job search query by the user, using the extracted features from the previous job search query to identify one or more jobs in the online social networking system, and providing the identified one or more jobs to the user; and comprising instructions for determining a score based on a similarity between the features extracted from the previous job search query of the user and features extracted from the profile of the user; and enhancing the job recommendation using features from the profile of the user when the score crosses a threshold.

* * * * *